US 6,809,721 B2

(12) United States Patent
Love

(10) Patent No.: US 6,809,721 B2
(45) Date of Patent: *Oct. 26, 2004

(54) "MINI-STICK" MODULE—NEW MOBILES JOYSTICK INPUT DEVICE

(75) Inventor: John Stephen Love, Sioux City, IA (US)

(73) Assignee: Gateway, Inc., Poway, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/298,009

(22) Filed: Apr. 22, 1999

(65) Prior Publication Data

US 2002/0018049 A1 Feb. 14, 2002

(51) Int. Cl.[7] .................................................. G09G 5/08
(52) U.S. Cl. ........................................ 345/161; 345/157
(58) Field of Search ................................ 345/161, 156; 463/36–39; D14/412; 273/148 B; 361/680, 686; 439/11, 13; 74/471

(56) References Cited

U.S. PATENT DOCUMENTS

| 4,500,867 A | * | 2/1985 | Ishitobi et al. ............... 338/128 |
| 4,586,763 A | * | 5/1986 | Paulsen et al. ............... 439/29 |
| 4,924,216 A | | 5/1990 | Leung ........................ 340/709 |
| 5,287,246 A | | 2/1994 | Sen ............................ 361/683 |
| 5,307,297 A | | 4/1994 | Iguchi et al. ............. 364/708.1 |
| 5,421,590 A | * | 6/1995 | Robbins ....................... 463/37 |
| 5,428,355 A | | 6/1995 | Jondrow et al. ............... 341/20 |
| 5,541,622 A | | 7/1996 | Engle et al. ................. 345/161 |
| 5,546,334 A | | 8/1996 | Hsieh et al. ........... 364/709.11 |
| 5,607,158 A | * | 3/1997 | Chan ...................... 273/148 B |
| 5,615,083 A | | 3/1997 | Burnett ....................... 361/686 |
| 5,666,138 A | | 9/1997 | Culver ........................ 345/161 |
| 5,793,355 A | * | 8/1998 | Youens ........................ 345/157 |
| 6,205,021 B1 | * | 3/2001 | Klein et al. ................. 361/683 |

FOREIGN PATENT DOCUMENTS

| JP | 06-139013 | * | 5/1994 | ........... G06F/3/033 |
| JP | 2000-315138 | * | 11/2000 | ........... G06F/3/033 |

OTHER PUBLICATIONS

Technology Playgroup Inc., Advertisement, Custom Prototype for SOFTIMAGE Special Projects, Feb 98, URL: http://this.is/tpg/products/unwinder.

Interlink Electronics Advertisement, Micro Joystick, Mar. 98; URL: http://www.interlinkelec.com/products/page03b.htm.

* cited by examiner

Primary Examiner—Alexander Eisen
(74) Attorney, Agent, or Firm—Scott Charles Richardson; Christopher Rueppell; Suiter-West

(57) ABSTRACT

A joystick designed to be used primarily in a mobile computing environment. The joystick is designed to attach to the side of a notebook computer in such a way that the support of the notebook computer becomes the support of the joystick. The interface the joystick uses to communicate with the computer is a Universal Serial Bus (USB) connection. A pass-through port has also been included to allow the joystick to participate in the daisy chain capabilities of USB technology.

26 Claims, 3 Drawing Sheets

"MINI-STICK" MODULE— NEW MOBILES JOYSTICK INPUT DEVICE

FIELD OF THE INVENTION

The present invention relates to input devices for use in computing systems and, more particularly, to input devices for the mobile computing environment.

BACKGROUND OF THE INVENTION

Present art in the area of mobile computing joysticks is very limited. One such joystick is a model comparable in size to that of joysticks typically used on many home computing systems. A joystick of this size has several obvious limitations for the mobile computer user. The most obvious limitation is the added weight such a large joystick adds to the total tote weight of a mobile system. Another limitation experienced from such a large joystick is the platform needed to support an apparatus of this size which, in most cases, is not available to the mobile user. This lack of proper support introduces yet another limitation which requires the operator of the joystick to use both hands, one for supporting the device and one for operating the joystick.

Smaller, more compact joysticks have been developed in an attempt to overcome the limitations of the larger models. However, limitations still exist. Often in these smaller joysticks, the operator is required to use both hands to support the joystick. This limitation stems from the method by which the devices interface with the mobile computer unit. These smaller joysticks interface with the mobile computer unit via a cable, again leaving the joystick without any support.

Another frustrating limitation inherent in the prior art, large or small, is the technology by which the joystick is interfaced with the mobile computer unit. Previous technology has forced the user to ensure that the computer one wishes to use with a joystick is powered down before connecting the joystick. In the world of mobile computing, one not only experiences having to power down and then power back up, but the excessive battery drain that results from repeated powering up and powering down is also experienced.

What is needed is a design that eliminates the need for an extra platform to support the joystick apparatus, a design that adds negligible tote weight to the mobile unit, and a design that utilizes the most current technology, making it possible to attach and detach the joystick without having to be concerned about the power state of the computer unit.

SUMMARY OF THE INVENTION

Accordingly, the present invention provides a joystick for fixedly attaching to a mobile computer system comprising a communication interface configured to couple the joystick to the mobile computer system, an attachment device configured to fixedly attach the joystick to the mobile computer system, and wherein the communication interface includes an interface configured to couple the joystick to a second device while the joystick is coupled to the mobile computer system.

The present invention also provides an information handling system comprising at least one processor, memory, a communication bus configured to couple the processor and the memory, a joystick for fixedly attaching to an information handling system including a communication interface configured to couple the joystick to the communication bus, an attachment device configured to fixedly attach the joystick to the information handling system, and wherein the communication interface includes an interface configured to couple the communication bus to a second device while the joystick is coupled to the communication bus.

The present invention also provides a method for coupling a joystick to a computer and a second device. The method comprises the steps of maintaining a communication interface configured to couple the joystick to the computer, and coupling the joystick to the computer by using the communication interface. The step of maintaining a communication interface includes maintaining an interface configured to couple the joystick to the second device while the joystick is coupled to the computer.

It is an object of the present invention to provide a joystick device which can utilize the support base provided by the notebook computer case, eliminating the need for the user to operate the joystick with both hands or search for a proper support base for the joystick.

It is another object of the present invention to provide a joystick that adds an unnoticeable amount of weight to the total tote weight of the mobile unit.

It is another object of the present invention to provide an interface between the computer and the joystick which will eliminate the need for the user to be concerned about the power state of the computer when detaching or attaching the joystick.

The present invention provides the advantage of a design that attaches the joystick unit to the notebook computer in such a way that the computer case becomes the needed support for the joystick.

The present invention also provides the advantage of a lightweight design, adding an unnoticeable amount of weight to the total tote weight of the mobile unit.

The present invention further provides the advantage of an interface to the computer based on Universal Serial Bus interface technology that allows the user to disregard the power state of the computer and attach and detach the joystick freely.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF A PREFERRED EMBODIMENT OF THE INVENTION

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1A:
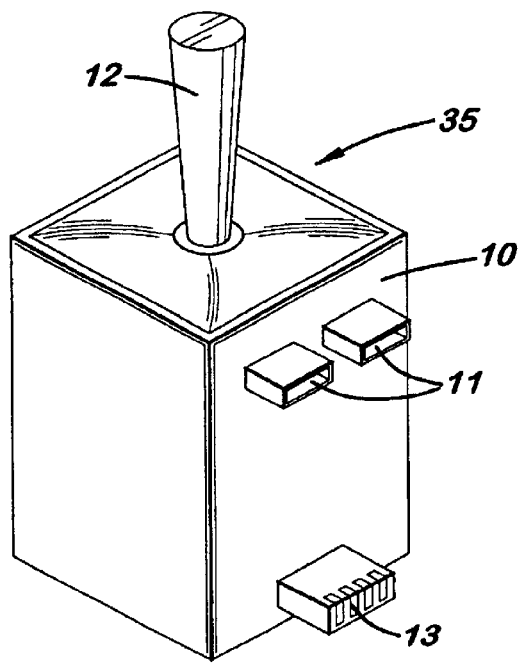
FIG. 1A is a perspective view of a joystick according to the preferred embodiment of the present invention.

Referring now to FIG. 1A, a perspective view of a joystick 35 according to the preferred embodiment of the present invention is shown. Joystick 35 is integrated into a joystick unit housing 10. Joystick unit housing 10, cubical or similar ergonomic shape, is made up of a rigid material similar, but not limited, to that used in the manufacture of notebook computer shells. Joystick unit housing 10 forms the foundation on which joystick 35 is built. Included on joystick unit housing 10 are a series of pins 11 whose function is to act as an attachment device configured to lock joystick unit housing 10 in place onto the case of a notebook computer. Attachment device or pins 11, whose function is to interlock two components, can be implemented in a variety of ways as can be appreciated by one having ordinary skill in the art. The rigid quality of joystick unit housing 10 is also intended to maintain the integrity of the hardware, protecting it from the many mishaps that can occur with portable hardware.

Figure 1B:
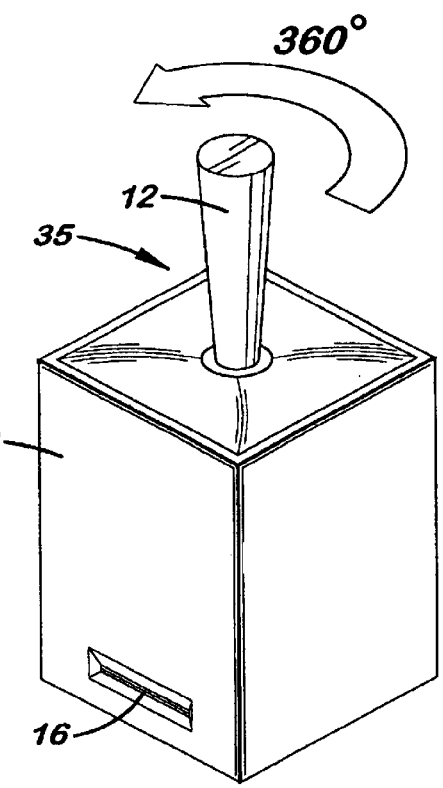
FIG. 1B is a perspective view of the side opposite that depicted in FIG. 1A of the joystick according to the preferred embodiment of the present invention.

Referring now to FIG. 1B, a perspective view of joystick 35 according to the preferred embodiment of the present invention is shown. Reference numerals or letters in FIG. 1B which are like, similar, or identical to the reference numerals or letters of FIG. 1A indicate like, similar, or identical components or features. Protruding from the top portion of joystick unit housing 10 is a mini-stick module 12 for controlling movement. Mini-stick module 12 employs, and is attached to, a signaling circuit featuring a spring loaded, two-axis design capable of rotating through 360 degrees, according to the preferred embodiment of the present invention, and is configured to interact with a notebook computer and/or the software running on it. The implementation of the signaling circuitry needed to accomplish movement via joystick 35 is understood well by those skilled in the art and can be implemented using a wide variety of methodologies and technologies.

Still referring to FIGS. 1A and 1B, the communication technology employed by joystick 35, as defined herein, is known as USB, or Universal Serial Bus. Universal Serial Bus is well known by those in the art, and therefore, the details of which will be omitted here. Included on joystick unit housing 10 are two USB interface connections. Primary USB connection 13, as depicted in FIG. 1A, is known in the art as a male connection. This male connection is designed such that it will functionally attach to preexisting female connection 14 on a notebook computer. Primary USB connection 13 is designed to facilitate connection of joystick 35 to notebook computer 15 in a manner in which signals generated from the use of joystick 35 are transmitted to notebook computer 15 and processed accordingly. The secondary USB connection 16 on joystick 35 is installed on the side of joystick unit housing 10 opposite primary USB connection 13. Secondary USB connection 16, as depicted in FIG. 1B, is known in the art as a female connection. The purpose of secondary USB connection 16 is to allow a user to employ the daisy chaining capabilities supported by USB. To facilitate this, primary USB connection 13 will be connected to secondary USB connection 16, internal to joystick unit housing 10, in such a way as to function as a pass-through port. The presence of this pass-through port will enable other USB devices, limited only by USB specifications and revisions thereof, to be attached in this daisy chain manner.

Figure 1C:
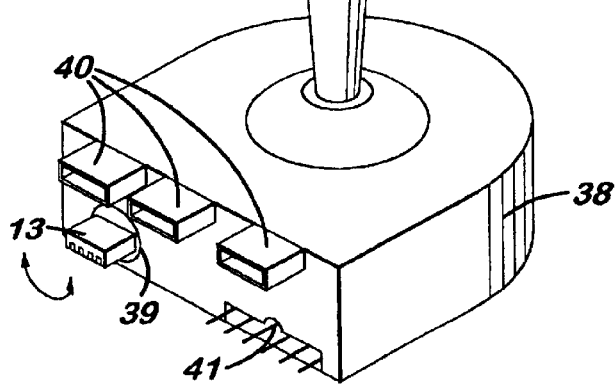
FIG. 1C is a perspective view of an alternate embodiment of the joystick illustrated in FIGS. 1A and 1B according to the present invention.

Referring now to FIG. 1C, an alternate embodiment of the present invention is illustrated. Reference numerals or letters in FIG. 1C which are like, similar, or identical to the reference numerals or letters of FIGS. 1A and 1B, indicate like, similar, or identical components or features. As illustrated in FIG. 1C, joystick 37 contains many of the same components as its counterpart joystick 35. Mini-stick module 12 for controlling movement protrudes from the top portion of joystick housing unit 38. Mini-stick module 12 employs, and is attached to, a signaling circuit featuring a spring loaded, two-axis design capable of rotating through 360 degrees, according to this alternate embodiment. Primary USB connection 13, in this alternate embodiment, is rotatably attached to joystick housing unit 38 via rotator 39. Rotator 39 allows primary USB connection 13 to rotate through a wide range of angles making it easier to operably connect joystick 37 to notebook computer 15.

Figure 3:
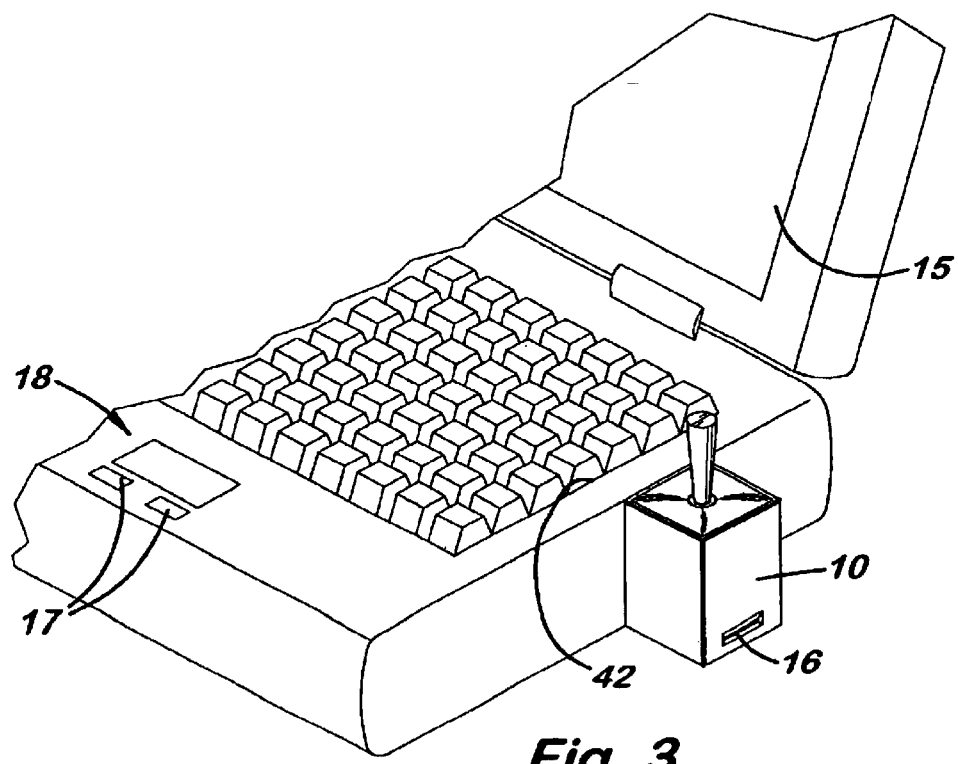
FIG. 3 is a perspective view of a system according to the preferred embodiment of the present invention after the connection of the joystick of FIG. 1A.

Also illustrated in FIG. 1C, is the joystick's 37 ability to attach to notebook computer 15 without requiring additional holes in the notebook computer's 15 case. Hooks or "fingers" 40 are attached to the end of joystick unit housing 38 to allow for this unobtrusive attachment. The fingers 40 are configured such that when a user attaches joystick 37 to notebook computer 15, fingers 40 hook onto the top side of notebook computer 15. The tips of fingers 40 are inserted into the crevice 42, as illustrated in FIG. 3, that parallels the right edge of notebook computer 15. The crevice 42 lies between the right edge of notebook computer 15 and the rightmost row of keyboard keys on the top side of notebook computer 15. Additional fingers 40 may be attached to the bottom of joystick 37 to gain added support. The two sets of fingers 40, attached at the top and bottom edges of joystick housing unit 38, form a "C" clamp type of grip on the notebook computer's 15 case.

An alternative support mechanism for the bottom of joystick 37 is illustrated by support notch 41. Support notch 41 is a recessed notch configured to attach onto a movable, or non-movable, similarly shaped hook protruding from the case of notebook computer 15. By utilizing the rotatable primary USB connection 13, in conjunction with fingers 40 and support notch 41, joystick 37 can be easily connected and then rotated into a fully supported operating position.

Figure 2:
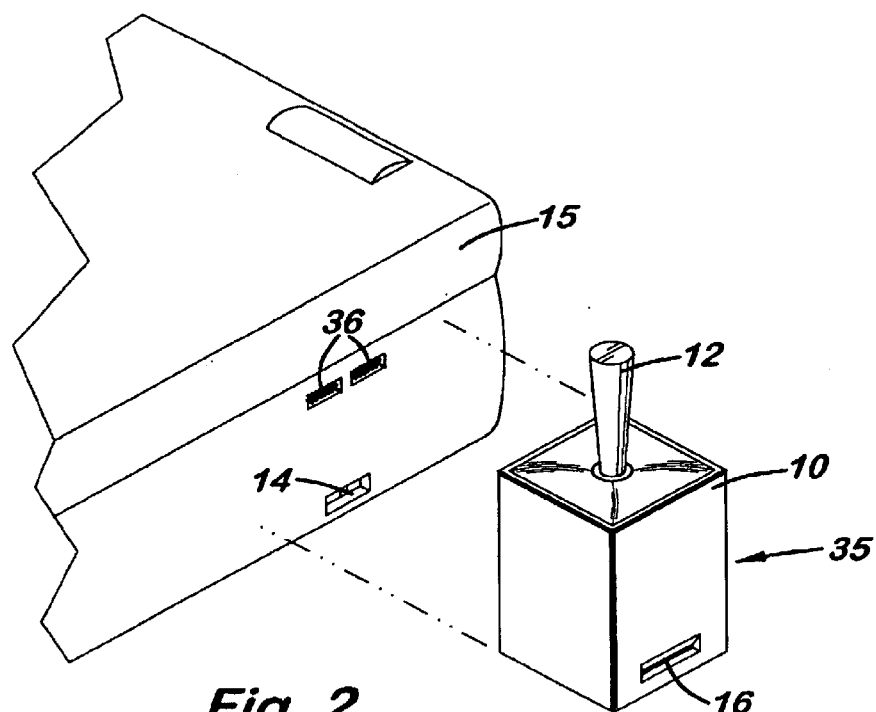
FIG. 2 is a perspective view of a system according to the preferred embodiment of the present invention prior to the connection of the joystick of FIG. 1A.

Referring now to FIGS. 2 and 3, a perspective view of notebook computer 15 and joystick 35, prior to connection, FIG. 2, and a perspective view of notebook computer 15 and joystick 35 after connection, FIG. 3, according to the preferred embodiment of the present invention are shown. Reference numerals or letters in FIGS. 2 and 3 which are like, similar, or identical to the reference numerals or letters of FIGS. 1A and 1B, indicate like, similar, or identical components or features. The preferred system embodiment of the present invention comprises notebook computer 15 and joystick 35, as described herein, operably coupled together. Communication between the two units will be established by the connection made via primary USB connection 13 on joystick unit housing 10 in conjunction with female USB connector 14 present on notebook computer 15. This union between the notebook computer 15 and the joystick 35, depicted in FIG. 3, will also involve locking pins 11 on joystick unit housing 10 interlocking with counterpart sockets 36 integrated on notebook computer 15. An alternative embodiment of the present invention utilizes pins as opposed to locking pins 11. Button functionality usually incorporated onto a joystick can be accomplished via driver software which converts mouse buttons 17, commonly integrated into notebook computer mouse 18, into the "fire" buttons typically found on joystick devices, allowing full joystick functionality once joystick 35 is operably connected.

This preferred embodiment of the present invention addresses all the limitations in the currently available mobile joystick device arena. The issue of added weight has been eliminated by the compact design of joystick unit housing 10 explained herein. Also, the issue of needing a platform for supporting the joystick has been eliminated by attaching joystick 35, via locking pins 11 and primary USB connection 13, described herein, to notebook computer 15 to establish a relationship using the stability of notebook computer 15 as that needed to support joystick 35. Interfacing the joystick 35 to the notebook computer 15 via a USB connection eliminates the concerns regarding the power state of notebook computer 15. This hot-swappable characteristic of USB not only allows the user to freely attach and detach joystick 35, it also overcomes the issue of battery life lost from repeated powering up and powering down of notebook computer 15.

Figure 4:
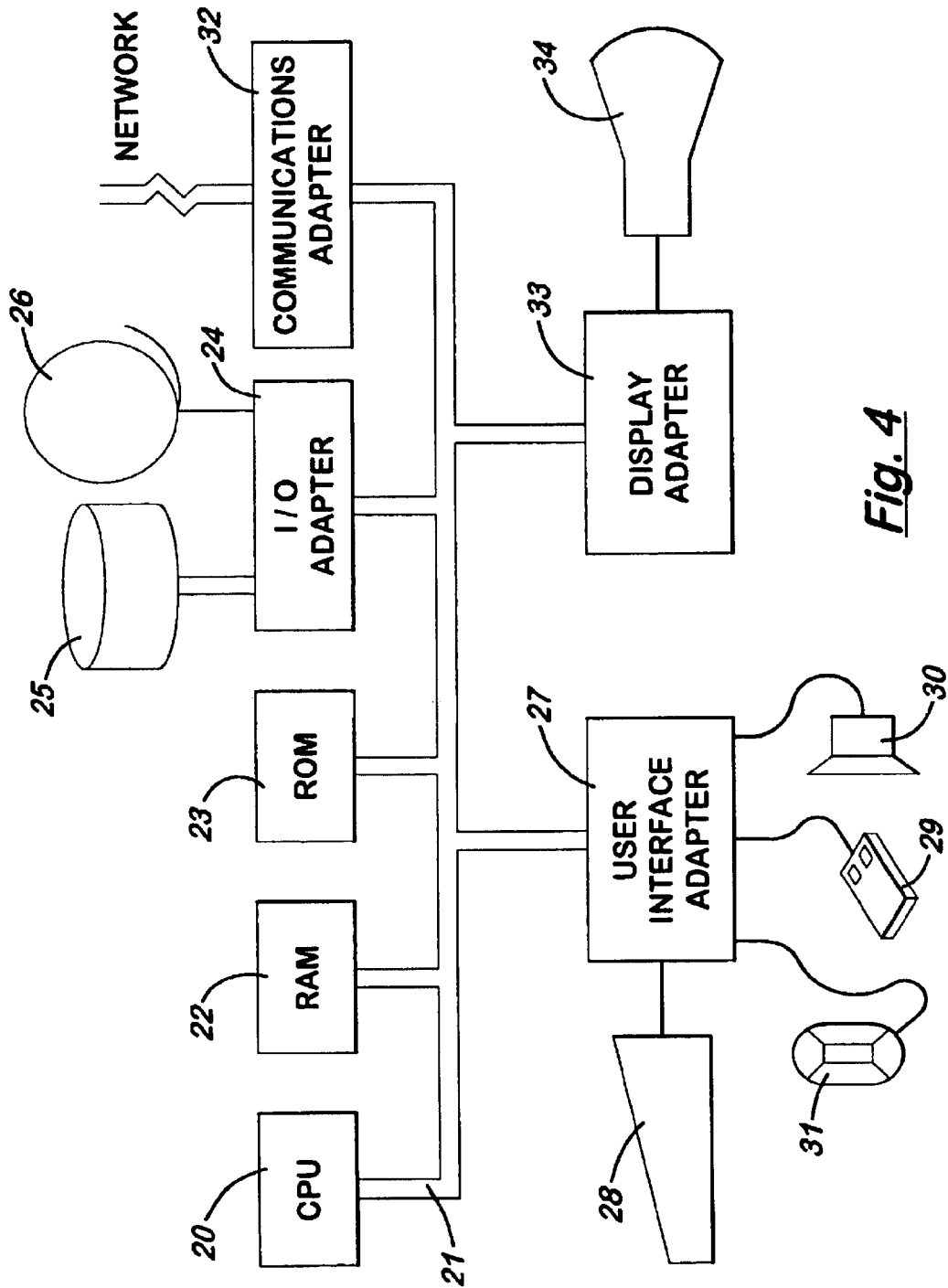
FIG. 4 is a detailed block diagram of the system depicted in FIGS. 2 and 3 according to the preferred embodiment of the present invention.

Referring now to FIG. 4, a detailed block diagram of a system according to a preferred embodiment of the present invention is shown. Reference numerals or letters in FIG. 4 which are like, similar, or identical to the reference numerals or letters of FIGS. 1A–3 indicate like, similar, or identical components or features. The system, a notebook computer 15, is configured generally as at least one central processing unit (CPU) 20 interconnected via at least one system bus 21, to random access memory (RAM) 22, read-only memory (ROM) 23, input/output (I/O) controller 24 for connecting peripheral devices, such as disk units 25 and tape drives 26, to the one or more system bus 21, at least one user interface adapter 27 for connecting keyboard 28, pointing device 29, speaker 30, microphone 31, and/or other user interface devices, such as a touch screen device (not shown), to one or more system bus 21, at least one communications adapter 32 for connecting a notebook computer 15 to an information network such as the Internet, and at least one display adapter 33 for connecting one or more system bus to display device 34. User interface adapter 27 can operate on many technologies. Serial ports, PS2 ports and USB ports are just a few of the possibilities. As can be interpreted, if the primary user interface adapter 27 does not utilize USB technology, a secondary user interface adapter 27 will need to be incorporated into the notebook computer 15 that utilizes USB technology.

Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

I claim:
1. An input/output device, comprising:
a device housing;
a primary connection oriented along a first axis and configured to be suitable for coupling said input/output device to a computer system, the primary connection suitable for movably attaching the device housing to the computer system; and
a secondary connection operable as a pass-through port suitable for enabling a second device to communicatively connect to the computer system which is attached to the device housing utilizing said primary connection,
wherein the device housing is rotatably attached to a computer system housing so as to enable the device housing to rotate through at least two axes with respect to the computer system housing, said at least two axes each being perpendicular to said first axis.

2. The input/output device as described in claim 1, wherein the primary connection rotatably attaches the device housing to the computer system.

3. The input/output device as described in claim 1, wherein the device housing is rotatably attached to the computer system housing so as to enable the device housing to rotate through a plurality of angles with respect to the computer system housing.

4. The input/output device as described in claim 1, wherein the device housing is rotatably attached to the computer system housing so as to enable the device housing to rotate through 360 degrees with respect to the computer system housing.

5. The input/output device as described in claim 1, wherein a second device coupled to the secondary connection is able to access the computer system coupled to the primary connection.

6. The input/output device as described in claim 1, wherein the primary connection does not utilize a connector cable.

7. The input/output device as described in claim 1, wherein the secondary connection is oriented parallel to the primary connection.

8. The input/output device as described in claim 1, wherein the primary connection comprises a USB connector.

9. The input/output device as described in claim 1, wherein the computer system is a notebook computer system.

10. The input/output device as described in claim 1, wherein said first axis is oriented in a direction parallel to a row of keyboard keys of said computer system.

11. An information handling system, comprising:
an information handling system housing having contained therein
at least one processor,
memory, and
a communication bus configured to couple the processor and the memory; and
an input/output device, including
a device housing,
a primary connection oriented along a first axis and configured to be suitable for coupling said input/output device to the information handling system housing, the primary connection suitable for movably attaching the device housing to the information handling system housing, and
a secondary connection operable as a pass-through port suitable for enabling a second device to communicatively connect to the information handling system which is attached to the device housing utilizing said primary connection, wherein the device hosing is rotatably attached to the information handling system housing so as to enable the device housing to rotate through at least two axes with respect to the information handling system housing, said at least two axes each being perpendicular to said first axis, wherein the information handling system is a notebook computer system.

12. The input/output device as described in claim 11, wherein said first axis is oriented in a direction parallel to a row of keyboard keys of said computer system.

13. A joystick, comprising:

a device housing;

a primary connection oriented along a first axis and configured to be suitable for coupling to a computer system, the primary connection suitable for movably attaching the device housing to the computer system; and a secondary connection operable as a pass-through port suitable for enabling a second device to communicatively connect to the computer system which is attached to the device housing utilizing said primary connection, wherein the device housing is rotatably attached to a computer system housing so as to enable the device housing to rotate through at least two axes with respect to the computer system housing, said at least two axes each being perpendicular to said first axis.

14. The joystick as described in claim 13, wherein the primary connection rotatably attaches the device housing to the computer system.

15. The joystick as described in claim 13, wherein the device housing is rotatably attached to the computer system housing so as to enable the device hosing to rotate through a plurality of angle with respect to the computer system housing.

16. The joystick as described in claim 13, wherein a second device coupled to the secondary connection is able to access the computer system coupled to the primary connection.

17. The joystick as described in claim 13, wherein the primary connection does not utilize a connector cable.

18. The joystick as described in claim 13, wherein the secondary connection is oriented parallel to the primary connection.

19. The joystick as described in claim 13, wherein the primary connection comprises a USB connector.

20. The joystick as described in claim 4, wherein the computer system is a notebook computer system.

21. The joystick as described in claim 13, wherein said first axis is oriented in a direction parallel to a row of keyboard keys of said computer system.

22. A joystick input/output device configured to be fixedly attached to a mobile computer system comprising:

a joystick housing;

an interface connection mounted on said joystick housing in an orientation along a first axis and configured to be suitable for coupling said joystick input/output device to said mobile computer system; and a support mechanism configured to fixedly attach the interface connection of said joystick input/output device to the mobile computer system and movably attach the joystick housing with the mobile computer system, wherein said first axis is oriented in a direction parallel to a row of keyboard keys of said mobile computer system.

23. The joystick input/output device as described in claim 22, wherein said interface connection is a universal serial bus interface.

24. The joystick input/output device as described in claim 23, wherein said universal serial bus interface of the joystick input/output device includes a universal serial bus male connector to couple said joystick input/output device to a universal serial bus female connector of the mobile computer system.

25. The joystick input/output device as described in claim 23, wherein said interface connection is a first interface connection, the joystick input/output device further comprising:

a second interface connection mounted on said joystick housing and configured to be suitable for coupling said joystick input/output device to an other device.

26. The joystick input/output device as described in claim 25, wherein said universal serial bus interface includes a universal serial bus pass-thru port to couple said joystick input/output device to said other device.

* * * * *